(12) United States Patent
Yoshida et al.

(10) Patent No.: US 6,674,874 B1
(45) Date of Patent: Jan. 6, 2004

(54) DATA PROCESSING APPARATUS AND METHOD AND STORAGE MEDIUM

(75) Inventors: Jun Yoshida, Yokohama (JP); Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,307

(22) Filed: Nov. 19, 1999

(30) Foreign Application Priority Data

Nov. 27, 1998 (JP) .......................................... 10-337258

(51) Int. Cl.$^7$ ................................................. G06K 9/00
(52) U.S. Cl. ........................ 382/100; 713/176; 380/205
(58) Field of Search ........................ 382/100; 713/176; 380/54, 205, 234, 279

(56) References Cited

U.S. PATENT DOCUMENTS

| | | | |
|---|---|---|---|
| 5,636,292 A | | 6/1997 | Rhoads ........................ 382/232 |
| 5,915,027 A | * | 6/1999 | Cox et al. ..................... 380/54 |
| 5,940,134 A | * | 8/1999 | Wirtz ........................... 348/473 |
| 6,157,330 A | * | 12/2000 | Bruekers et al. ............. 341/143 |
| 6,208,735 B1 | * | 3/2001 | Cox et al. ..................... 283/113 |
| 6,226,387 B1 | * | 5/2001 | Tewfik et al. ................ 382/100 |
| 6,311,214 B1 | * | 10/2001 | Rhoads ........................ 380/255 |
| 6,330,672 B1 | * | 12/2001 | Shur ............................. 380/54 |
| 6,345,100 B1 | * | 2/2002 | Levine ......................... 380/205 |
| 6,385,596 B1 | * | 5/2002 | Wiser et al. .................. 369/84 |
| 6,411,725 B1 | * | 6/2002 | Rhoads ........................ 382/100 |
| 6,425,081 B1 | * | 7/2002 | Iwamura ....................... 705/58 |
| 2002/0009208 A1 | * | 1/2002 | Alattar et al. ............... 382/100 |

OTHER PUBLICATIONS

Nakamura, et al., "A Method of Watermarking under Frequency Domain for Protecting Copyright of Digital Image," The 1997 Symposium on Cryptography and Information Security, SCIS '97 26A, Feb. 1, 1997.

Ohnishi, et al., "A Watermarking Scheme to Image Data by PN Sequence," The 1997 Symposium on Cryptography and Information Security, SCIS '97 26B, Feb. 1, 1997.

Ishizuka, et al., "On an Experimental Evaluation of Steganography with Wavelet Transform," The 1997 Symposium on Cryptography and Information Security, SCIS '97 26D, Feb. 1, 1997.

Akira Inoue, et al., "Electronic Watermark –Encryption System in Multimedia Age", pp. 33–53, Maruyama Gakugei Tosho Co., Ltd, (1997). (With partial translation).

Eiji Okamoto, "Introduction of Encryption Theory", pp. 33–59 and 87–107, Kyoritsu Shuppan Co., Ltd. (1993). (With partial translation).

* cited by examiner

Primary Examiner—Bhavesh M. Mehta
Assistant Examiner—Barry Choobin
(74) Attorney, Agent, or Firm—Fitzpatrick, Cella, Harper & Scinto

(57) ABSTRACT

It is an object to provide a digital watermark embedding technique for integratedly managing a plurality of kinds of contents such as still images, motion images, audio sound, and the like. To accomplish this object, the invention has, for example, an input device for inputting a first kind of data line and a second kind of data line, and an embedding device for embedding digital watermark information which is concerned with each other to each of the first and second data lines.

22 Claims, 9 Drawing Sheets

DATA PROCESSING APPARATUS AND METHOD AND STORAGE MEDIUM

BACKGROUND OF THE INVENTION

1. Field of the Invention

The invention relates to data processing apparatus and method for handling digital watermark information in digital contents and also relates to a storage medium which stores such a method.

2. Related Background Art

Hitherto, a technique called a digital watermark has been known as a method of preventing contents such as motion images, still images, audio sound, or the like from being illegally copied. The digital watermark is a technique for embedding additional information into the contents so that a human being cannot perceive it.

According to the digital watermark embedding technique, digital watermark information is embedded in a state as it is into digital contents or watermark information is once converted into digital information and, thereafter, the digital watermark information is embedded into analog contents.

Hitherto, a system for embedding digital watermark information by performing an arithmetic operation to a lightness value and a chromaticity value of each pixel of a still image is known. For example, in U.S. Pat. No. 5,636,292, a system whereby digital contents are divided into blocks and a "watermark pattern" constructed by values of +1 and −1 is added to every block is used.

As another embedding method, a method whereby a frequency transformation (Fourier transformation, discrete cosine transformation, wavelet transformation, etc.) is performed to a still image, watermark information is added into a frequency region, and thereafter, a reverse frequency transformation is performed is known.

According to a method of using the Fourier transformation, a PN line is added to input contents and the resultant contents are diffused and, thereafter, divided into blocks. The Fourier transformation is performed every block and digital watermark information of 1 bit is embedded into one block. A reverse Fourier transformation is performed to the block in which the digital watermark information was embedded and the same PN line as that used at the first stage is again added to the resultant contents, so that the contents in which the digital watermark was embedded is derived. A detailed technique of the above method has been disclosed in, for example, Onishi, Oka, and Matsui, "Method of Watermark Signature into Image by PN line", Records of Symposium about Encryption and Information Security, SCIS 97-26B, 1997.

According to a method of using the discrete cosine transformation, input contents are divided into blocks and a discrete cosine transformation is performed every block. After information of 1bit was embedded into one block, the reverse transformation is performed, thereby forming contents in which a digital watermark was embedded. A detailed technique of the above method has been disclosed in, for example, Nakamura, Ogawa, and Takashima, "Digital Watermark System in Frequency Region for Protection of Copyright of Digital Image", Records of Symposium about Encryption and Information Security, SCIS 97-26A, 1997.

According to a method of using the wavelet transformation, there is no need to divide input contents into blocks. A detailed technique of the above method has been disclosed in, Ishizuka, Sakai, and Sakurai, "Experimental Examination Regarding Safety and Reliability of Digital Watermark Technique using Wavelet Transformation", Records of Symposium about Encryption and Information Security, SCIS 97-26D, 1997.

As for a technique for embedding digital watermark information into audio data as well, the digital watermark information can be embedded by a method whereby input contents are divided into blocks and, thereafter, a frequency transformation is performed, digital watermark information is embedded, and a reverse frequency transformation is performed in a manner similar to the case of an image.

A method whereby audio data is wavelet transformed and digital watermark information is embedded into obtained wavelet coefficients has also been known. Such a kind of technique has been disclosed in detail in, for example, Inoue and Sugi, "Encryption System of Digital Watermark—Encryption System in Multimedia Age", Maruyama Gakugei Tosho Co., Ltd.

As a technique for embedding a digital watermark into motion image data, a method of embedding it into a motion vector or a method of combining motion images which are obtained from two cameras for photographing an object from slightly different angles has been known.

For example, according to MPEG as one of the motion image compression systems, by obtaining a difference between frames, a redundancy in the time base direction is reduced, the obtained difference is DCT transformed and variable length encoded, and a redundancy in the spatial direction is reduced, thereby realizing high efficient encoding. In this case, by paying attention to that there is a high correlation between continuous frames, a difference between the target frame to be encoded and the frame that is time-preceding or subsequent to the target frame is obtained, thereby reducing the redundancy. In MPEG, one unit (GOP) is formed by one I-picture (intra encoding image), four P-pictures (forward predictive encoding images), and ten B-pictures (bidirectional predictive encoding images), and a combination such that the I-picture is arranged at the head and the B-picture and P-picture are repetitively arranged is recommended. By arranging the I-picture at a predetermined period, a special reproduction such as a reverse reproduction or the like and a partial reproduction using the GOP as a unit are enabled and an error propagation is prevented. A motion compensation is performed in MPEG. That is, a difference between the target block and the macroblock close to the corresponding block of the preceding or subsequent frame is obtained on a unit basis of predetermined blocks (macroblock) obtained by collecting four blocks with respect to luminance data and two blocks with regard to color difference data, in which each block consists of (8 pixels×8 pixels), and the macroblock of the smallest difference is searched, thereby detecting a motion vector. The detected motion vector is encoded as data. Upon decoding, corresponding macroblock data of the preceding or subsequent frame is extracted by using the detected motion vector, thereby decoding the encoding data which was encoded by using the motion compensation. In the motion compensation as mentioned above, after the time-preceding frame was once encoded, it is again decoded, and the resultant decoded frame is set to a preceding frame, and the motion compensation is performed by using the macroblock in such a preceding frame and the macroblock of the frame to be encoded. In the method of embedding the digital watermark information into the motion vector of the motion image which is encoded as mentioned above, the movement of one motion vector is made to correspond to one bit of a bit train of the watermark information. That is, when the user wants to set a value of such one bit to "1", the vector is moved by a distance of an extent such that it cannot be visually recognized. When the user wants to set a value of such one bit to "0", the vector is not moved. All of the digital watermark information can be embedded by performing such a process to many motion vectors.

Subsequently, the method of embedding the digital watermark information by photographing the object from slightly different angles by using two cameras will now be described. Since the angles are very small, a difference between the two images photographed by two cameras cannot be visually discriminated. The two cameras are now assumed to be A and B. The images photographed by the cameras A and B are divided every frame and the divided images are assumed to be (a1, a2, . . . , an) and (b1, b2, . . . , bn), respectively. The images are selected in order showing the digital watermark information from the frames of the images photographed by the cameras A and B, thereby constructing motion image data. For example, one frame is made to correspond to one bit constructing the digital watermark information. In the case of showing "1", the frame of the image photographed by the camera A is applied and in the case of showing "0", the frame of the image photographed by the camera B is applied.

Hitherto, although there is a method of individually embedding information to a plurality of kinds of contents such as still images, motion images, audio sound, and the like, a digital watermark embedding technique to integratedly manage them is not established yet.

SUMMARY OF THE INVENTION

The invention is made to solve the above problems and it is a main object of the invention to provide a digital watermark embedding technique for integratedly managing a plurality of kinds of contents such as still images, motion images, audio sound, and the like.

To accomplish the above object, according to a preferred embodiment of the invention, there is provided a data processing apparatus comprising: input unit for inputting a first kind of data line and a second kind of data line; and embedding unit for embedding first and second digital watermark information which are concerned with each other into each of the first and second data lines.

According to another preferred embodiment of the invention, there is provided a data processing apparatus comprising: input unit for inputting a first kind of data line and a second kind of data line which are concerned with respect to time; extracting unit for extracting digital watermark information from each of the first and second data lines; and control unit for controlling whether the first and second data lines are outputted or not with reference to the extracted digital watermark information.

According to still another preferred embodiment of the invention, there is provided a data processing apparatus comprising: input unit for inputting a first kind of data line and a second kind of data line which are concerned with respect to time; first dividing unit for dividing the first data line into a plurality of lines; second dividing unit for dividing the second data line into a plurality of lines; and embedding unit for embedding one of the first data lines obtained by the first dividing unit as digital watermark information into one of the second data lines obtained by the second dividing unit.

The above and other objects and features of the present invention will become apparent from the following detailed description and the appended claims with reference to the accompanying drawings.

DETAILED DESCRIPTION OF THE PREFERRED EMBODIMENTS

Embodiments which are suitable for the present invention will now be sequentially described hereinbelow.

First Embodiment

Figure 1:
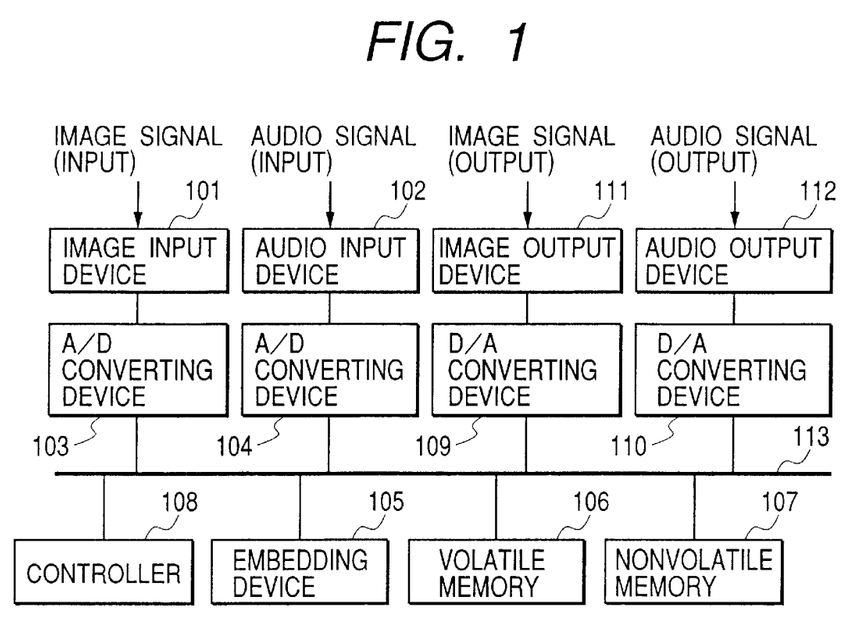
FIG. 1 is a diagram showing a construction of each device for embedding digital watermark information.

FIG. 1 is a block diagram showing a digital watermark embedding apparatus according to an embodiment.

The present apparatus (101 to 113) is connected to, for example, two video tape recorders on the reproducing side of images and audio sound and the image recording (sound recording) side and used. In the video tape recorder on the reproducing side, an original video tape before digital watermark information is embedded is reproduced. Reproduced images and audio sound are inputted from an image input device and an audio input device to the digital watermark embedding device, respectively. The images and audio sound in which the digital watermark information was embedded by the digital watermark embedding device are inputted to the video tape recorder on the image recording side and recorded.

The present apparatus of FIG. 1 comprises: an image input device 101 to fetch an analog image signal into the present apparatus; an audio input device 102 to fetch an analog audio signal into the present apparatus; A/D converting devices 103 and 104 to convert the inputted analog image or audio sound into digital data; and a digital watermark embedding device 105.

The digital watermark embedding device 105 generates digital watermark information by arithmetically operating, for example, inputted images or audio data and embeds the digital watermark information into contents by using key data such as coordinate information or the like showing an embedding position of the digital watermark information stored in a nonvolatile memory 107.

The present apparatus of FIG. 1 further has: a volatile memory 106 which is used to temporarily store data; the nonvolatile memory 107 for storing key data or the like such as coordinates data showing the embedding position of the digital watermark information; a controller 108 for executing the digital watermark embedding system according to the embodiment by controlling each device installed in the present apparatus; D/A converting devices 109 and 110 each for converting digital data subjected to a digital watermark embedding process by the present apparatus into analog data; an image output device 111 for outputting the image and audio sound in which the digital watermark information was embedded by the present apparatus to the video tape recorder or the like; an audio output device 112; and a data bus 113 which is used to exchange the digital data among the devices constructing the present apparatus.

The operation of each of the above devices will now be described in detail.

The analog image data reproduced by the video tape recorder on the reproducing side and outputted from its image output terminal is inputted from the image input device 101 of the present apparatus of FIG. 1, converted into digital data by the A/D converting device 103, and stored into the volatile memory 106. Similarly, the analog audio data outputted from an audio output terminal of the video tape recorder on the reproducing side is inputted from the audio input device 102, converted into digital data by the A/D converting device 104, and stored into the volatile memory 106.

In the digital watermark embedding device 105, an arithmetic operation is performed by using at least one of the image and audio data stored in the volatile memory 106, thereby generating the digital watermark information, or digital watermark information is inputted from the outside. Subsequently, the digital watermark embedding device 105 embeds the generated digital watermark information into at least one of the image and audio data by using the key data stored in the nonvolatile memory 107.

The image and/or audio data in which the digital watermark information was embedded is converted into analog data by the D/A converting devices 109 and 110, respectively. The analog image signal is outputted to an image input terminal of the video tape recorder on the image recording side by the image output device 111, the analog audio signal is outputted to an audio input terminal of the video tape recorder on the image recording (audio recording) side by the audio output device 112, and they are recorded on the image recording (audio recording) side, respectively.

Figure 2:
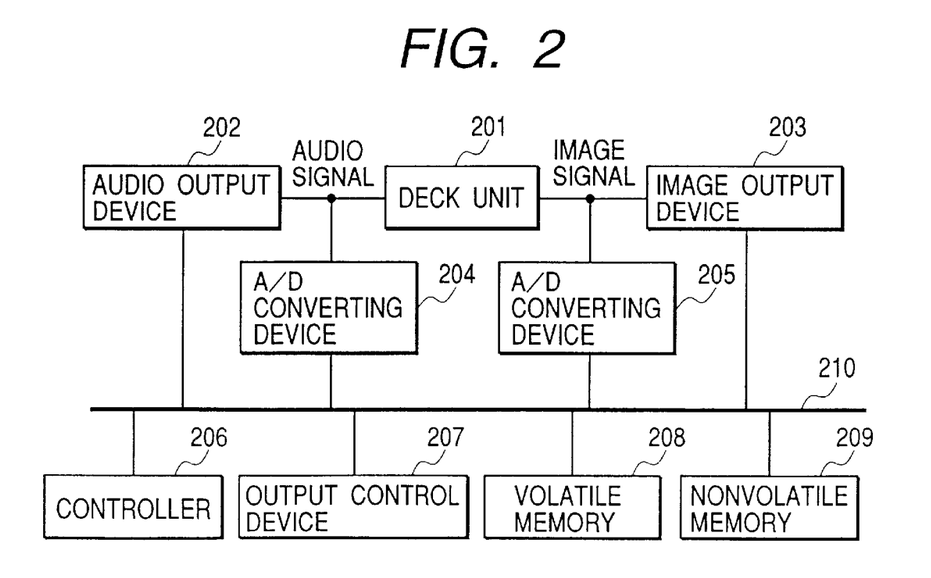
FIG. 2 is a diagram showing an output device of the first embodiment.

FIG. 2 shows an output device for disabling the data in a contents-recorded recording medium to be reproduced in the case where an altering process such that a caption is illegally inserted. Dubbing is performed, or the like is performed to the contents in which the digital watermark information was embedded by the embedding device 105 in FIG. 1.

The output device has: a deck unit 201 for reading the data stored on the recording medium, separating it into an audio signal and an image signal, and outputting; an audio output device 202 which is controlled by an output control device 207; an image output device 203 which is similarly controlled by the output control device 207; A/D converting devices 204 and 205 for converting the audio signal and image signal outputted from the deck unit 201 into digital audio data and image data; and a controller 206 for controlling each of the devices which construct the present apparatus and executing an output method according to the embodiment.

The output device further has: the output control device 207; a volatile memory 208 which is used to temporarily store data, a result in the halfway of an arithmetic operation, and the like; a nonvolatile memory 209 for storing key data constructed by coordinate information or the like showing the embedding position to embed the digital watermark, and the like; and a data bus 210 which is used to exchange the digital data among the devices constructing the present apparatus.

The operation of each of the above devices will now be described in detail.

When the user intends to reproduce the signal in the recording medium in the deck unit 201, the signal recorded in the recording medium is read out and separated into an audio signal and an image signal. The audio signal is inputted to the audio output device 202, the image signal is inputted to the image output device 203, and those signals are temporarily stored in those output devices, respectively. The audio signal is converted by the A/D converting device 204 and the image signal is converted by the A/D converting device 205 into digital data (audio data and image data) and those digital data are temporarily stored into the volatile memory 208, respectively.

The output control device 207 obtains the audio data and image data from the volatile memory 208, extracts the information embedded in at least one of the image data and audio data as digital watermark information by using the key data or the like stored in the nonvolatile memory 209, and determines or controls an audio output and an image output by the audio output device 202 and image output device 203 on the basis of a result of the extraction.

Each embodiment of the generation of the digital watermark information and the digital watermark information embedding process by the digital watermark embedding device 105 and an output control process by the output control device 207 will now be specifically described.

Figure 3:
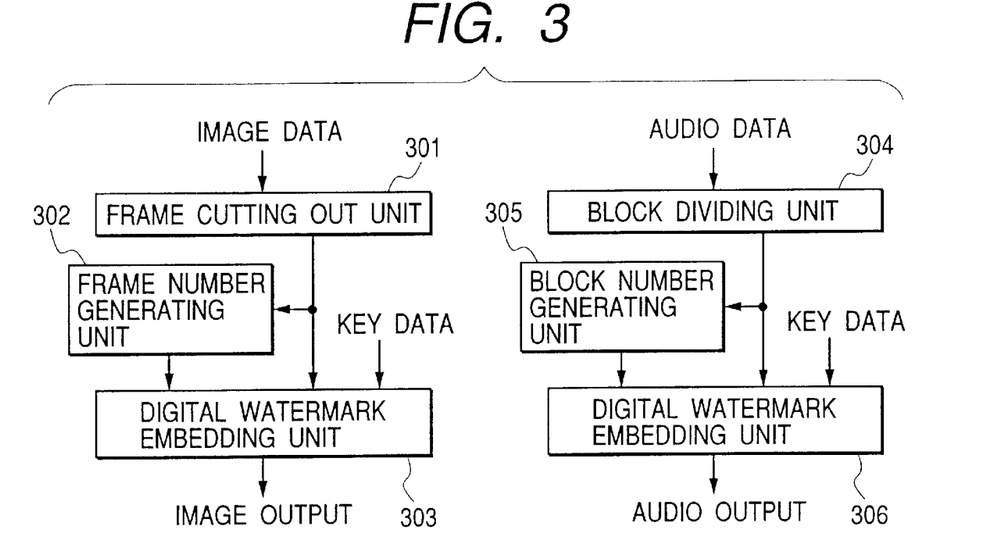
FIG. 3 is a diagram showing a digital watermark embedding system of the first embodiment.

FIG. 3 is a block diagram for embedding the digital watermark information by the digital watermark embedding device 105 in the embodiment.

In the present system, the image data is divided into frames, a frame number is allocated to each frame, and the allocated frame number is embedded as digital watermark information into each frame. The audio data is divided into blocks, a block number is allocated to each block, and the allocated block number is embedded as digital watermark information into each block.

The present system comprises: a frame cutting-out unit 301 for dividing the image data every frame; a frame number generating unit 302 for allocating the numbers to the frames in order from the head frame; a digital watermark embedding unit 303 for embedding the frame number into each frame of the image; a block dividing unit 304 for dividing the audio data into blocks; a block number generating unit 305 for allocating the numbers to the audio blocks in order from the head block; and a digital watermark embedding unit 306 for embedding the block number into each block of the audio data.

The operation of each unit will now be described in detail hereinbelow.

The inputted image data is divided into frames by the frame cutting-out unit 301 and sequentially outputted. Each of the outputted frames is inputted to the frame number generating unit 302 and the frame number is generated in order. For each frame, the frame number generated by the frame number generating unit 302, and the key data including the coordinate information indicative of the digital watermark embedding position and the like stored in the nonvolatile memory 107 are inputted to the digital watermark embedding unit 303. The frame number is embedded as digital watermark information into each frame and the resultant frame is outputted. The key data can be inputted from an external storage device or the like without being read out from the nonvolatile memory.

As for the audio data as well, the blocks divided by the block dividing unit 304 are inputted to the block number generating unit 305 and the block numbers are generated therefrom in a manner similar to the above.

For each block, the block number generated from the block number generating unit 305, and the key data including the coordinate information indicative of the digital watermark embedding position and the like are inputted to the digital watermark embedding unit 306. The block number is embedded into each block by the digital watermark embedding technique and the resultant block is outputted.

The output of the image data and the output of the audio data are temporarily stored into the volatile memory 106 and synchronized and, thereafter, they are converted into analog data by the D/A converting devices 109 and 110 and outputted from the image output device 111 and audio output device 112, respectively.

Figure 4:
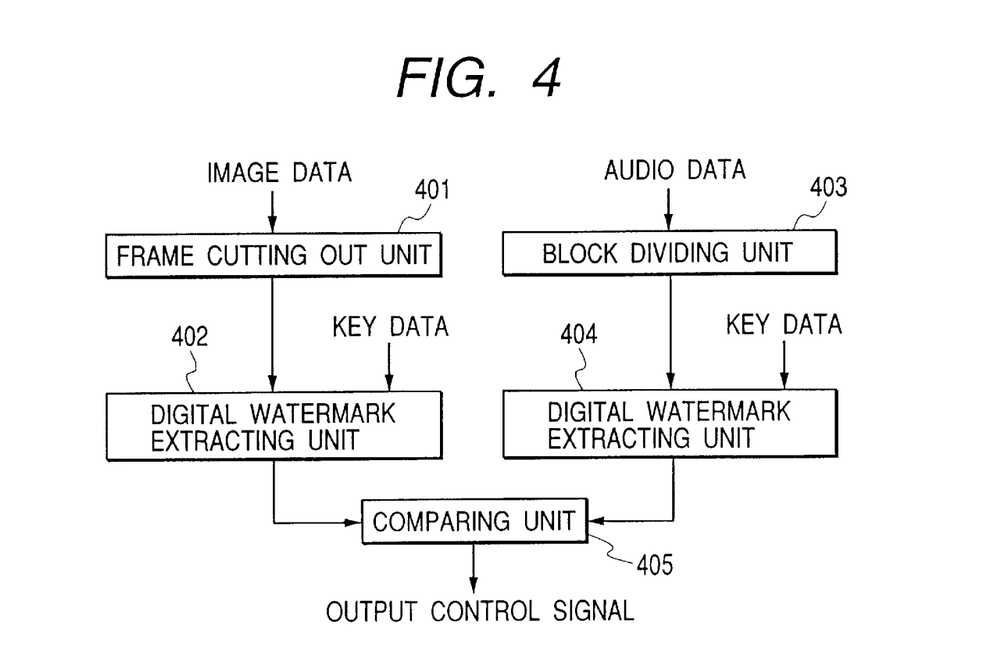
FIG. 4 is a diagram showing an example of an output control system of the first embodiment.

FIG. 4 is a diagram showing a construction to control whether the image and audio data in which the digital watermark information was embedded by the digital watermark embedding system of FIG. 3 are outputted or not and it is applied to the output control device 207 in FIG. 2.

A system of FIG. 4 comprises: a frame cutting-out unit 401 for performing the same operation as that of the frame cutting-out unit in FIG. 3; a digital watermark extracting unit 402 for extracting the frame number embedded as digital watermark information from each frame of the image; a block dividing unit 403 for performing the same operation as that of the block dividing unit in FIG. 3; a digital watermark extracting unit 404 for extracting the block number embedded as digital watermark information from each block of the audio data; and a comparing unit 405 for comparing the block number with the frame number, thereby discriminating whether they correctly correspond to each other with regard to the time or not. That is, in the present construction, since it is a prerequisite condition that, for both the audio data and the image data which should be reproduced at the same timing, the digital watermark information to make them correspond to each other is embedded therein, whether an alteration, edition, or the like has been performed to the audio or image data or not can be detected by the comparison of the comparing unit 405.

The operation of each of the above units will now be described in detail.

The inputted image data is sent to the frame cutting-out unit 401 and divided every frame. Each frame is inputted to the digital watermark extracting unit 402 together with the key data including the coordinate information showing the digital watermark embedding position and the like and the frame number is extracted. The inputted audio data is supplied to the block dividing unit 403 and divided into blocks. The block number is extracted from each block by the key data by the digital watermark extracting unit 404.

The frame number extracted by the digital watermark extracting unit 402 and the block number extracted by the digital watermark extracting unit 404 are inputted to the comparing unit 405. When they correctly correspond to each other with respect to time, a signal to permit the image and the audio data to be outputted, as they are, is generated. When this signal is detected, the audio data is outputted from the audio output device 202 and the image is outputted from the image output device 203, respectively. Therefore, if the mutual digital watermark information (frame number, block number) does not correctly correspond to each other or if either one of the digital watermark information cannot correctly be detected, one or both of the image and the audio data are not outputted. Therefore, the reproduction is not performed either.

Second Embodiment

Figure 5:
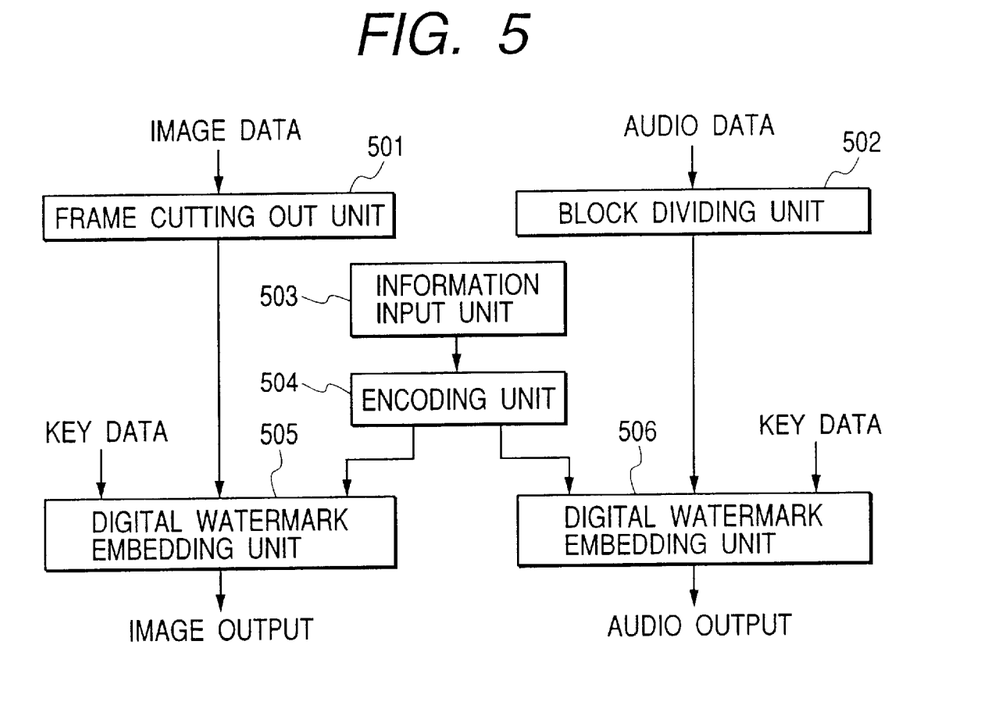
FIG. 5 is a diagram showing a digital watermark embedding system of the second embodiment.

FIG. 5 is a block diagram showing a digital watermark embedding system of the second embodiment. According to this system, information is inputted besides the image data and the audio data and information obtained by encoding this information is embedded as digital watermark information into the image data and the audio data.

The present system comprises: a frame cutting-out unit 501 for dividing the image data every frame; a block dividing unit 502 for dividing the audio data into blocks; an information input unit 503 for inputting information to be embedded as digital watermark information from the outside; an encoding unit 504 for encoding the inputted information as final digital watermark information; a digital watermark embedding unit 505 for embedding the digital watermark information into the frames of the image; and a digital watermark embedding unit 506 for embedding the digital watermark information into the blocks of the audio data.

The inputted image data is divided into frames by the frame cutting-out unit 501. The inputted audio data is divided into blocks by the block dividing unit 502. The digital watermark information inputted by the information input unit 503 such as a keyboard is encoded by an error correction encoding or the like by the encoding unit 504. The encoded digital watermark information is inputted to the digital watermark embedding unit 505 together with each frame and the foregoing key data. The digital watermark information is embedded into the frames of the image.

The digital watermark information is inputted to the digital watermark embedding unit 506 together with each block and the key data. The digital watermark information is also embedded in the frames of the audio data. At this time, although the digital watermark information can be embedded into all frames of the image data and all audio blocks, it can be embedded into a part of the frames of the image data and a part of the audio blocks. That is, it is sufficient that the same digital watermark information has been embedded into the frame of the image and the audio block which correspond to each other with respect to time.

In the case of using the above construction as well, by comparing the digital watermark information embedded in a predetermined image frame with that embedded in a predetermined audio block by the comparing unit 405 in FIG. 4, the output control system corresponding to the digital watermark embedding system in FIG. 5 can be constructed. At this time, if an error correction encoding has already been performed to the digital watermark information, the comparing unit 405 performs an error correction decoding before comparing the mutual information.

In the invention, a digital watermark embedding system such that the encoding unit 504 in FIG. 5 performs an error correction encoding to the digital watermark information and one of an information bit and a redundancy bit in an error correction code is written into the image frame and the other is written into the audio block can be also realized.

In this case, in the comparing unit 405 in FIG. 4, it is also possible to construct such that by comparing the redundancy bit obtained by error correction encoding the information bit embedded in one of the image frame and the audio block with the redundancy bit extracted from the digital watermark information embedded in the other, whether the image and the audio data correspond to each other with respect to time is detected and the output control can be performed.

A similar effect can be obtained by constructing such that the encoding unit 504 in FIG. 5 divides predetermined digital watermark information into two bit trains, one of them is embedded into a predetermined frame of the image data, and the other is embedded into a predetermined block of the audio data.

In this case, in the comparing unit 405 in FIG. 4, it is sufficient that the two pieces of digital watermark information embedded in both the image data and the audio data are extracted and it is confirmed that information reconstructed by further synthesizing them coincides with the predetermined information.

Third Embodiment

Figure 6:
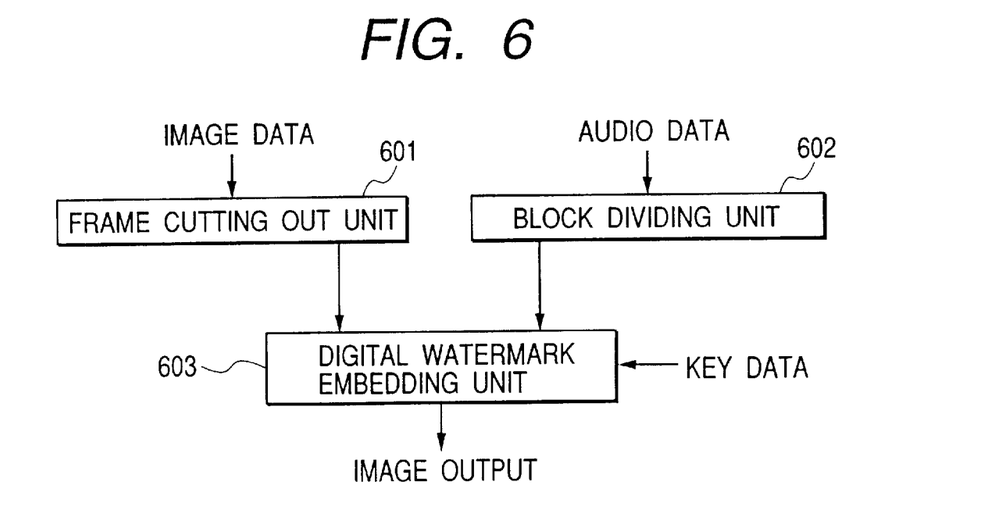
FIG. 6 is a diagram showing a digital watermark embedding system of the third embodiment.

FIG. 6 is a block diagram showing a digital watermark embedding system of the third embodiment.

According to the present system, the audio data is divided into the blocks of the same number as the number of frames of the image data and the image frames and the audio blocks are made perfectly to correspond in a one-to-one relationship, thereby embedding the block of the audio data corresponding to each frame of the image data.

The present system comprises: a frame cutting-out unit 601 for dividing the image data into frames and outputting every frame; a block dividing unit 602 for dividing the audio data into data each having the same length as a display time of each frame among the image frames and setting them to the respective blocks; and a digital watermark embedding unit 603 for embedding each block of the audio data into each frame of the image data.

The inputted image data comprising a plurality of frames is divided every frame by the frame cutting-out unit 601 and sequentially outputted. The inputted audio data is divided into the blocks of the same number as the number of image frames by the block dividing unit 602 and sequentially outputted. The digital watermark embedding unit 603 which receives the image and audio data obtained by the frame cutting-out unit 601 and block dividing unit 602 embeds each block of the audio data as digital watermark information into each frame by using the key data comprising the coordinate information indicative of the digital watermark information embedding position and the like and, thereafter, outputs the resultant frames. In this case, it is recognized that the output data is the contents comprising only the image data.

Figure 7:
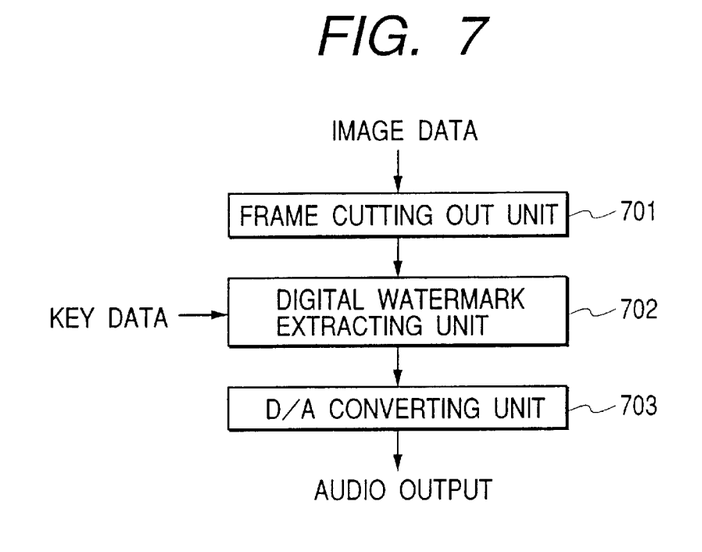
FIG. 7 is a diagram showing an example of an output control system of the third embodiment.

FIG. 7 is a block diagram showing an apparatus on the digital watermark extracting side corresponding to the digital watermark embedding system of FIG. 6.

The present system comprises: a frame cutting-out unit 701 for dividing the image data into frames; a digital watermark extracting unit 702 for extracting each block of the audio data embedded in the image frames; and a D/A converting unit 703. For example, it is assumed that a process of the D/A converting unit 703 is executed by the audio output device 202.

The image signal read out from the storage medium by the deck unit 201 is inputted to the image output device 203 and, at the same time, converted into the digital data by the A/D converting device 205. The image data converted to the digital data is divided every frame by the frame cutting-out unit 701. Each block of the audio data which has already been embedded is extracted by the digital watermark extracting unit 702 by using the foregoing key data. Each block of the extracted audio data is converted into the analog data by the D/A converting unit 703 and outputted by the audio output device 202.

Thus, the audio data can be embedded into contents such that it seems as if only the image data (signal) existed. Only the apparatus which knows this embedding system can also reproduce the audio data.

Fourth Embodiment

Figure 8:
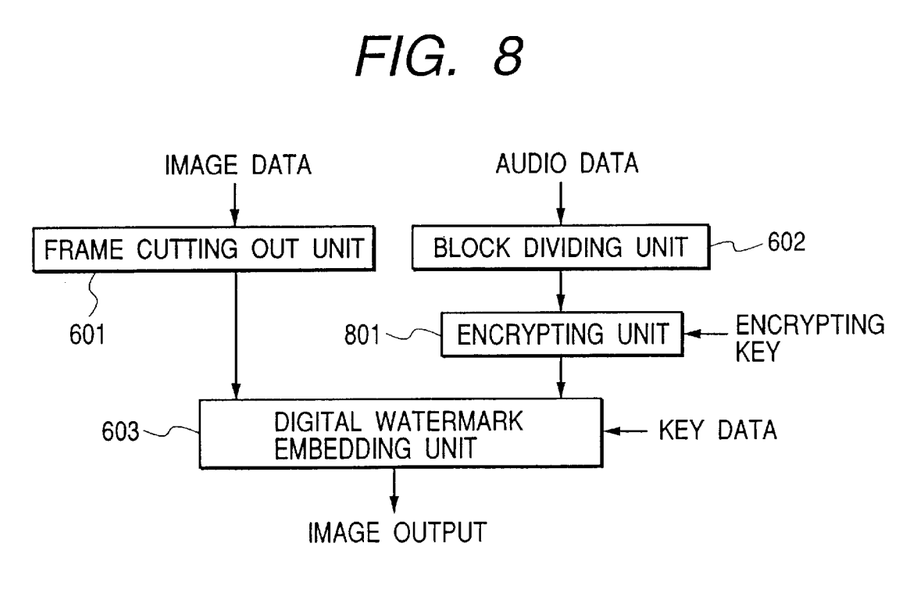
FIG. 8 is a diagram showing a digital watermark embedding system of the fourth embodiment.

FIG. 8 is a block diagram showing the fourth embodiment of a digital watermark embedding system.

According to this system, the audio data is divided into the blocks of the same number as the number of frames of the image data and the image frames and the audio blocks are made to correspond in a one-to-one relationship manner. Each audio block is encrypted and the encrypted audio block is embedded into the corresponding image frame.

The present system comprises: the frame cutting-out unit 601, block dividing unit 602, and digital watermark embedding unit 603 which perform the operations similar to those in FIG. 6; and an encrypting unit 801. A common key encrypting system such as DES or a public key encrypting system such as RSA is used as an encrypting system which is used here. Each encryption has been disclosed in detail in, for example, Eiji OKAMOTO, "Introduction of Encryption Theory", Kyoritsu Shuppan Co., Ltd.

The inputted audio data is divided into the blocks of the same number as the number of frames of the image data by the block dividing unit 602 and, thereafter, encrypted by the encrypting unit 801 by an inputted encrypting key. The encrypted audio data is embedded as a digital watermark into the image frames by the key data by the digital watermark embedding unit 603 and outputted.

Figure 9:
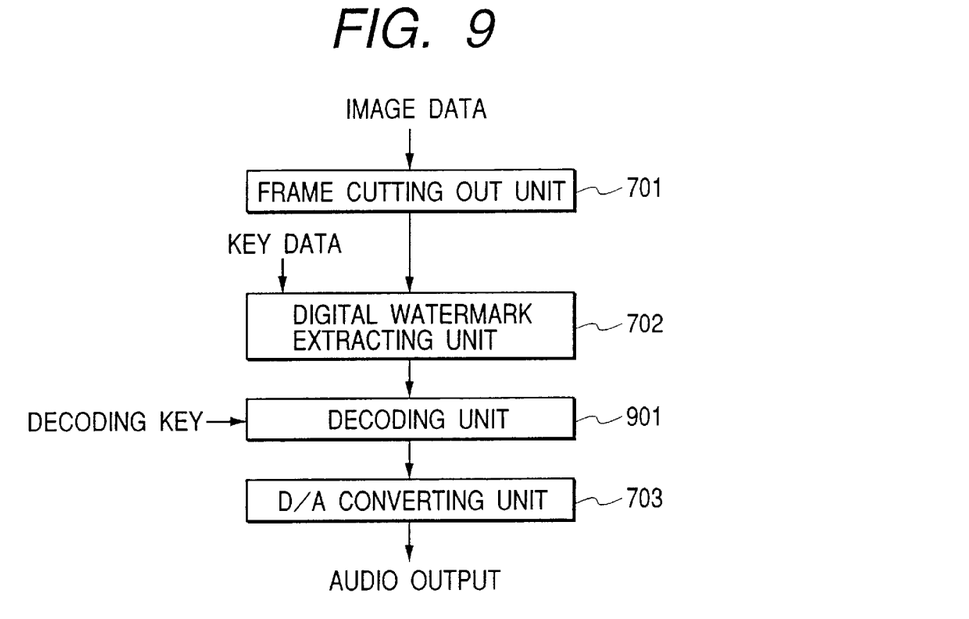
FIG. 9 is a diagram showing an example of an output control system of the fourth embodiment.

FIG. 9 is a block diagram on the digital watermark extracting side corresponding to the digital watermark embedding system in FIG. 8.

This system comprises: the frame cutting-out unit 701, digital watermark extracting unit 702, and D/A converting unit 703 which perform the operations similar to those of the output control system in FIG. 7; and a decoding unit 901 corresponding to the encrypting unit 801 in FIG. 8.

The inputted image data is divided into frames by the frame cutting-out unit 701. The digital watermark extracting unit 702 extracts each block of the audio data embedded as a digital watermark from each frame by using the foregoing key data. Each of the extracted blocks of the audio data is decoded by the decoding unit 901 and, thereafter, converted into an audio signal by the D/A converting unit 703, and outputted by the audio output device 202.

Thus, the audio data can be embedded into contents such that it seems as if only the image data (signal) existed. Only the apparatus which knows this embedding system can also reproduce the audio data.

Fifth Embodiment

Figure 10:
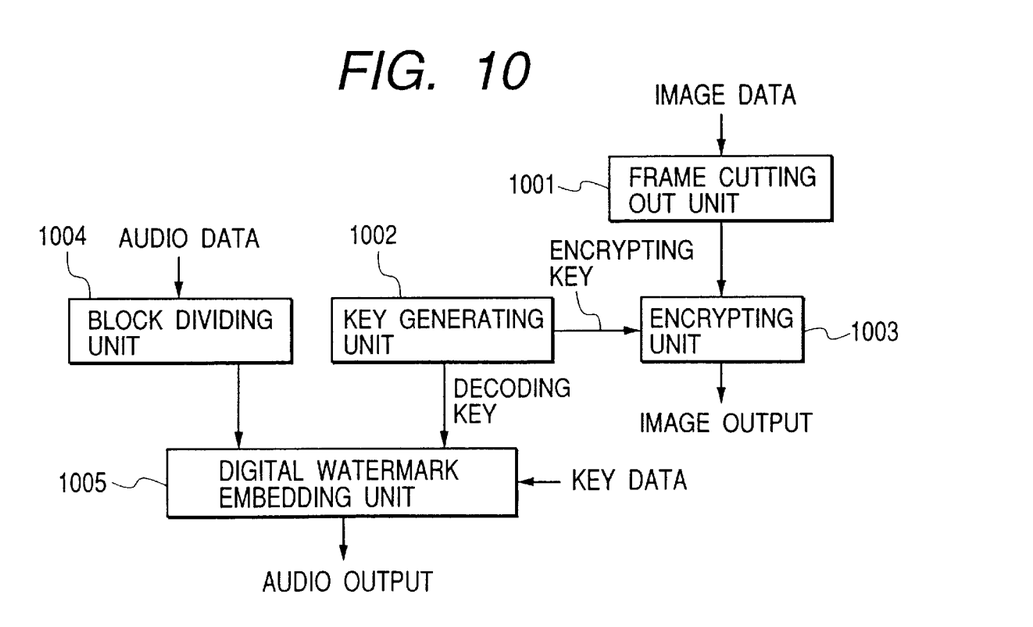
FIG. 10 is a diagram showing a digital watermark embedding system of the fifth embodiment.

FIG. 10 is a block diagram showing a digital watermark embedding system of the fifth embodiment.

According to this system, the audio data is divided into blocks, a set of an encrypting key and a decoding key is generated every block, and the frame which is displayed during the reproduction of each block of the audio data is encrypted by using the generated encrypting key. The decoding key is embedded as a digital watermark into each block of the audio data.

The present system comprises: a frame cutting-out unit 1001 for dividing the image into frames; a key generating unit 1002 for generating a set of the encrypting key and the decoding key; an encrypting unit 1003; a block dividing unit 1004 for dividing the audio data into blocks; and a digital watermark embedding unit 1005. The common key encrypting system such as DES or the public key encrypting system such as RSA is used as an encrypting system which is used here.

The inputted image data is divided into frames by the frame cutting-out unit 1001. The inputted audio data is divided into blocks by the block dividing unit 1004. The key generating unit 1002 generates a set of the encrypting key and the decoding key for each block of the audio data. In the encrypting unit 1003, the image frame which is displayed during the reproduction of the audio block is encrypted by using the encrypting key generated by the key generating unit 1002 and the resultant frame is outputted. The digital watermark embedding unit 1005 embeds the decoding key generated by the key generating unit 1002 into the audio data divided into the blocks and the resultant audio data is outputted.

Figure 11:
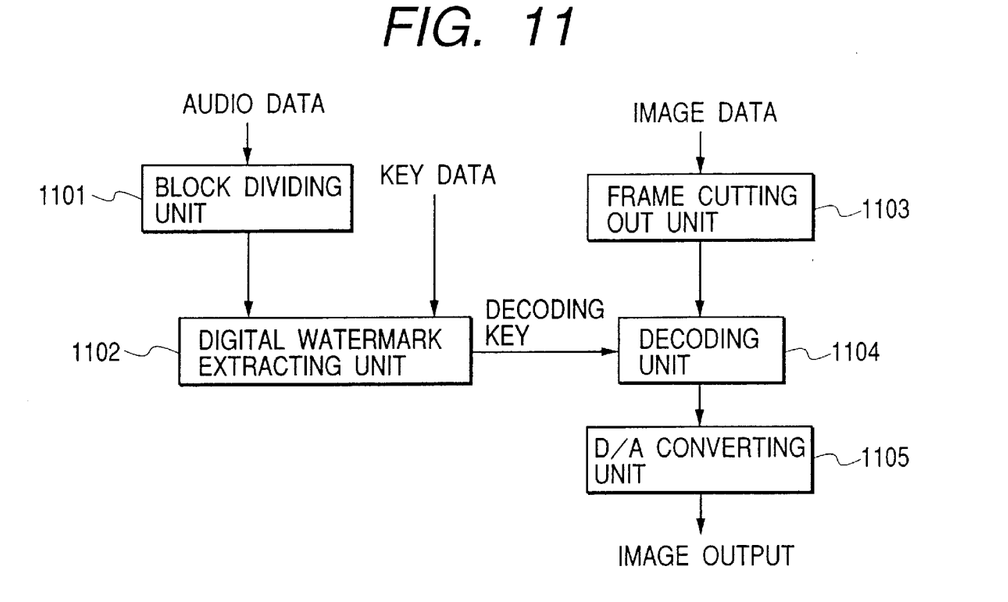
FIG. 11 is a diagram showing an example of an output control system of the fifth embodiment.

FIG. 11 is a block diagram showing an output control system corresponding to the digital watermark embedding system of FIG. 10.

This system comprises: a block dividing unit 1101 for dividing the audio data into blocks; a digital watermark extracting unit 1102; a frame cutting-out unit 1103 for dividing the image data into frames; a decoding unit 1104 for decoding the encryption performed to the frame; and a D/A converting unit 1105 which is executed by, for example, the image output device 203.

The inputted audio data is divided every block by the block dividing unit 1101 and inputted to the digital watermark extracting unit 1102 together with the key data comprising the coordinate information showing the digital watermark embedding position and the like. The digital watermark extracting unit 1102 extracts the decoding key embedded as a digital watermark and supplies it to the decoding unit 1104. The image data is divided every frame by the frame cutting-out unit 1103 and, thereafter, inputted to the decoding unit 1104 and decoded by the decoding key. The decoded frame is converted into an analog signal by the D/A converting unit 1105 and outputted by the image output device 203.

Sixth Embodiment

Figure 12:
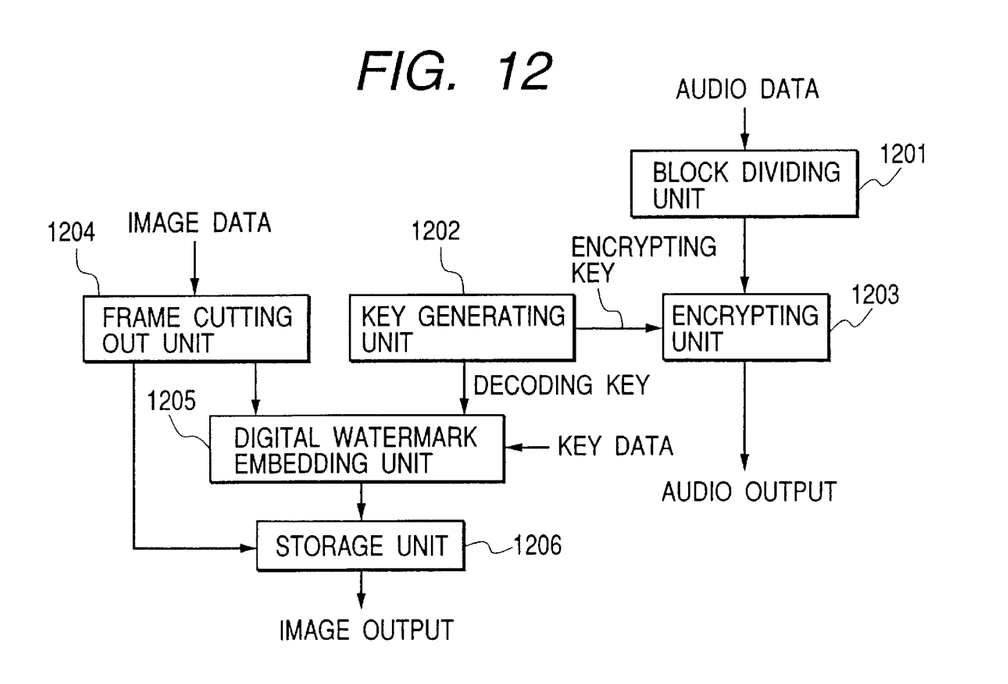
FIG. 12 is a diagram showing a digital watermark embedding system of the sixth embodiment.

FIG. 12 is a block diagram showing a digital watermark embedding system of the sixth embodiment.

In the present system, the audio data is divided into blocks, a set of an encrypting key and a decoding key is generated every block, and each block of the audio data is encrypted by using the generated encrypting key. The decoding key is embedded as digital watermark information into the head image block which is displayed during the reproduction of each block of the audio data.

The present system comprises: a block dividing unit 1201 for dividing the audio data into blocks; a key generating unit 1202 for generating a set of the encrypting key and the decoding key; an encrypting unit 1203; a frame cutting-out unit 1204 for extracting the head frame of each block of the corresponding audio data from the image data; a digital watermark embedding unit 1205; and a storage unit 1206 for aligning the order of frames.

The inputted audio data is divided every block by the block dividing unit 1201. The key generating unit 1202 generates sets of encrypting keys and decoding keys of the same number as the number of blocks of the audio data. The encrypting unit 1203 enciphers each block of the audio data by using the encrypting key generated by the key generating unit 1202 and outputs. As for the inputted image data, the frame corresponding to the head of each block of the audio data is extracted by the frame cutting-out unit 1204, the decoding key generated by the key generating unit 1202 is embedded by the digital watermark embedding unit 1205, and the resultant embedded frames are inputted to the storage unit 1206 together with the frame in which no digital watermark is embedded and outputted in correct order with respect to time.

Figure 13:
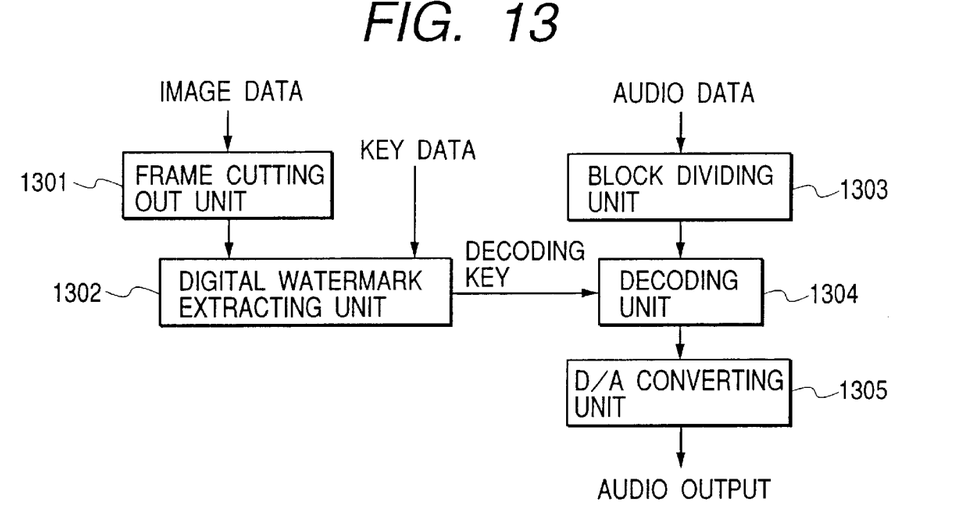
FIG. 13 is a diagram showing an example of an output control system of the sixth embodiment.

FIG. 13 is a block diagram showing an output control system corresponding to the digital watermark embedding system of FIG. 12.

This system comprises: a frame cutting-out unit 1301 for extracting the frame corresponding to the head block among the audio blocks from the image data; a digital watermark extracting unit 1302; a block dividing unit 1303 for dividing the audio data into blocks; a decoding unit 1304 for decoding an encryption performed to the audio blocks; and a D/A converting unit 1305 which is executed by the audio output device 202.

As for the inputted image data, the frame corresponding to the head block among the audio blocks is extracted by the frame cutting-out unit 1301. The extracted frame is inputted to the digital watermark extracting unit 1302 together with the key data comprising the coordinate information indicative of the digital watermark embedding position and the like. The digital watermark extracting unit 1302 extracts the decoding key embedded as a digital watermark in the frame and supplies it to the decoding unit 1304.

The inputted audio data is divided into audio blocks by the block dividing unit 1303 and inputted to the decoding unit 1304. The audio block is decoded by the decoding key by the decoding unit 1304, converted into an analog signal by the D/A converting unit 1305, and outputted by the audio output device 202.

Seventh Embodiment

Figure 14:
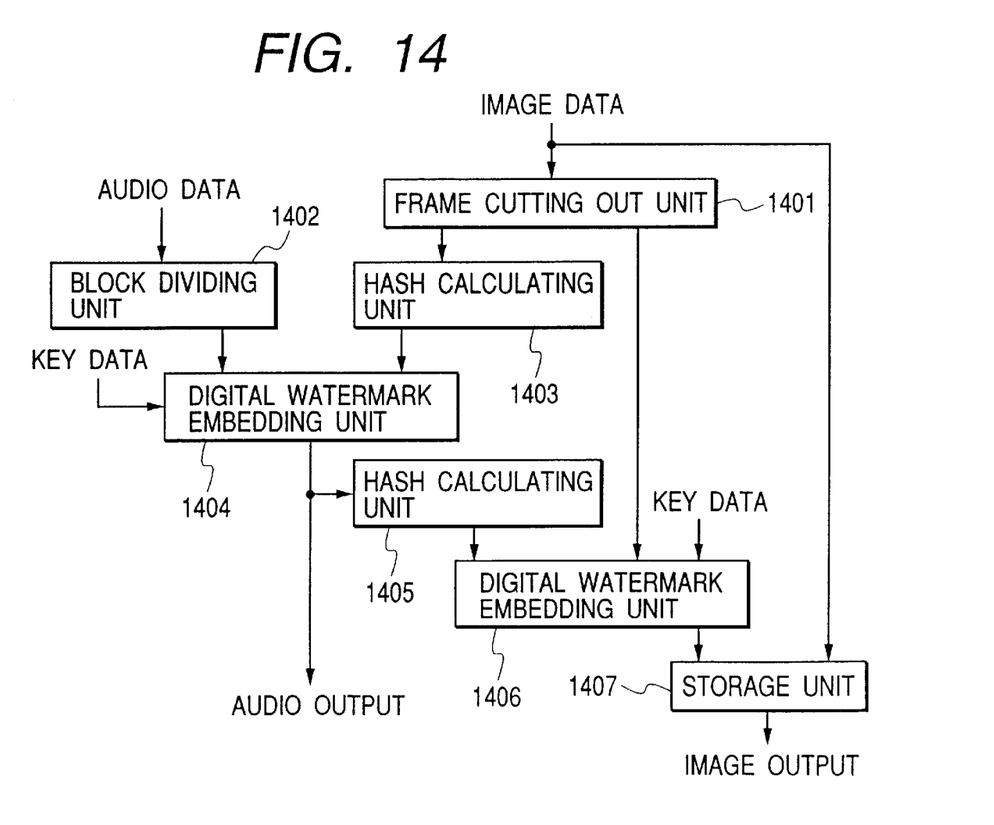
FIG. 14 is a diagram showing a digital watermark embedding system of the seventh embodiment.

FIG. 14 is a block diagram showing a digital watermark embedding system of the seventh embodiment.

This system comprises: a frame cutting-out unit 1401 for dividing the inputted image data into frames; a block dividing unit 1402 for dividing the audio data into blocks each having a predetermined length; a hash calculating unit 1403 for obtaining a hash value of a designated frame of the image data; a digital watermark embedding unit 1404 for embedding the hash value of each frame of the image data into each block of the audio data; a hash calculating unit 1405 for obtaining a hash value of each block of the audio data in which the digital watermark has already been embedded; a digital watermark embedding unit 1406 for embedding the hash value of each block of the audio data into a predetermined frame of the image data; and a storage unit 1407.

The hash value which is used in this system will now be described. A hash value h is a short output h as a compression value of a long input train x which is obtained by a hash function f:x→h. The hash value h is a unidirectional function and has a nature such that it is difficult to obtain different inputs x and x' which satisfy f(x')=f(x). As a typical function of the hash function, there is MD5 (Message Digest 5), SHA (Secure Hash Algorithm), or the like. The hash function has been described in detail in, for example, Eiji OKAMOTO, "Introduction of Encryption Theory", Kyoritsu Shuppan Co., Ltd.

The inputted image data is stored into the storage unit 1407, and a hash frame from which a hash value is obtained and an embedding frame in which a hash value of each block of the audio data is embedded are extracted by the frame cutting-out unit 1401. The audio data is divided into blocks each having a predetermined length by the block dividing unit 1402. The frame extraction and the block division are executed here in a manner such that one hash frame and one embedding frame exist within the time corresponding to one block of the audio data.

The hash calculating unit 1403 calculates a hash value from the hash frame obtained by the frame cutting-out unit 1401. The digital watermark embedding unit 1404 embeds the hash value into each block of the audio data by using the key data comprising the coordinate information showing the digital watermark information embedding position and the like. Each block of the audio data in which the digital watermark was embedded is outputted as an audio output and inputted to the hash calculating unit 1405, and the hash value is obtained. The obtained hash value is inputted to the digital watermark embedding unit 1406 and embedded as digital watermark information into the embedding frame by the key data.

The embedding frame in which the digital watermark information was embedded is replaced with the corresponding frame of the original image data stored in the storage unit 1407 and stored. After the embedding target frame was stored into the storage unit 1407, the image data stored in the storage unit 1407 is outputted as an image output.

Figure 15:
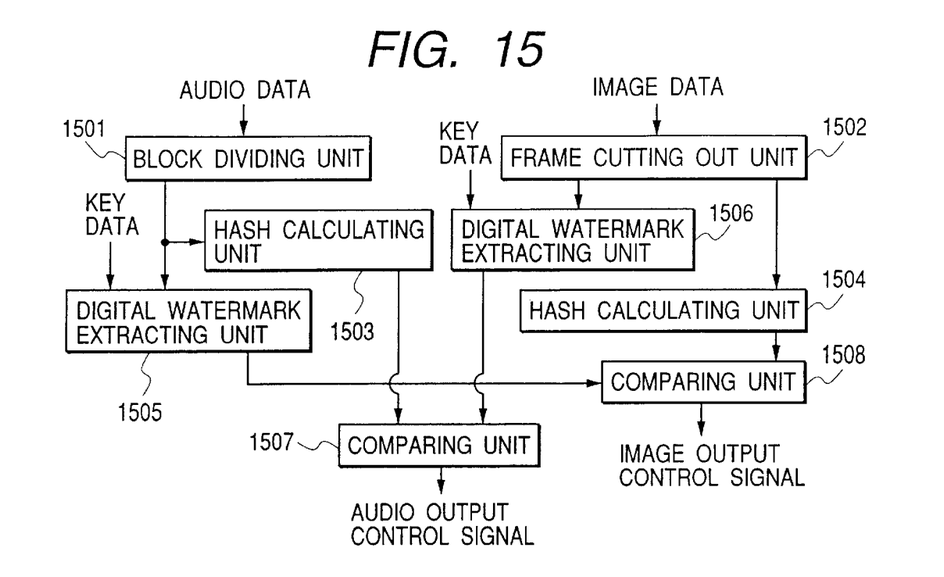
FIG. 15 is a diagram showing an example of an output control system of the seventh embodiment.

FIG. 15 is a block diagram showing an output control system corresponding to the digital watermark embedding system of FIG. 14.

The output control system comprises: a block dividing unit 1501 for dividing the audio data into blocks each having a predetermined length; a frame cutting-out unit 1502 for extracting the hash frame and embedding frame from the image data; a hash calculating unit 1503 for calculating a hash value of each block of the audio data; a hash calculating unit 1504 for calculating a hash value of the hash frame of the image data; a digital watermark extracting unit 1505 for extracting the hash value embedded in each block of the audio data; a digital watermark extracting unit 1506 for extracting the hash value of each block of the audio data embedded in the embedding frame; a comparing unit 1507 for comparing the hash value calculated from each block of the audio data with the hash value extracted from the embedding frame; and a comparing unit 1508 for comparing the hash value calculated from the hash frame with the hash value extracted from each block of the audio data.

The inputted audio data is divided into blocks each having a predetermined length by the block dividing unit 1501. The divided blocks are inputted every block to the hash calculating unit 1503 and a hash value is calculated. At the same time, the divided blocks are also inputted to the digital watermark extracting unit 1505 and the hash value of the hash frame of the image data embedded as a digital watermark is extracted.

The inputted image data is supplied to the frame cutting-out unit 1502 and the hash frame and the embedding frame are extracted. The hash frame is inputted to the hash calculating unit 1504 and a hash value is calculated. The embedding frame is inputted to the digital watermark extracting unit 1506 and the embedded hash value is extracted. The hash value of each block of the audio data which was calculated by the hash calculating unit 1503 and the hash value extracted from the embedding frame by the digital watermark extracting unit 1506 are inputted to the comparing unit 1507 and compared.

When the hash values coincide, namely, when it is determined that the audio data coincides with the original audio data, a control signal is generated so as to allow the audio output device 202 to generate an audio sound. When the hash values do not coincide, the audio output device 202 outputs no audio sound but generates a control signal so as to abandon the block of the stored audio data.

The hash value calculated from the hash frame by the hash calculating unit 1504 and the hash value extracted from each block of the audio data by the digital watermark extracting unit 1505 are inputted to the comparing unit 1508 and compared. When the hash values coincide, namely, when it is determined that the image data coincides with the original image data, a control signal is generated so as to allow the image output device 203 to generate an image. When the hash values do not coincide, the image output device 203 generates no image but a control signal is generated so as to abandon the stored data.

Eighth Embodiment

Figure 16:
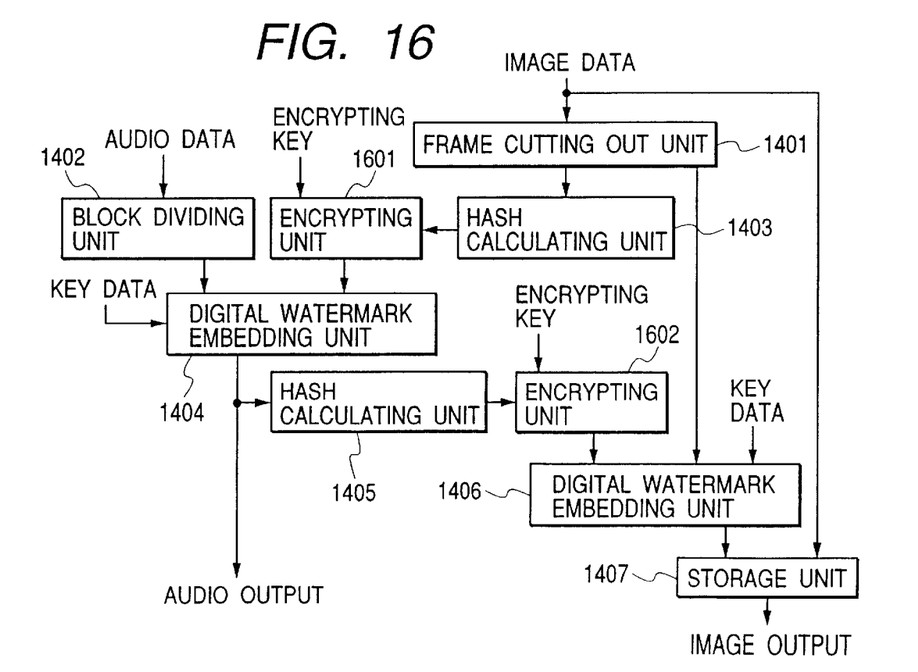
FIG. 16 is a diagram showing a digital watermark embedding system of the eighth embodiment.

FIG. 16 is a block diagram showing a digital watermark embedding system of the eighth embodiment.

This system comprises: the frame cutting-out unit 1401, block dividing unit 1402, hash calculating unit 1403, digital watermark embedding unit 1404, hash calculating unit 1405, digital watermark embedding unit 1406, and storage unit 1407 which perform the operations similar to those in FIG. 14; and encrypting units 1601 and 1602 for encrypting the hash values obtained by the hash calculating units 1403 and 1405.

The hash value of the hash frame generated by the hash calculating unit 1403 is enciphered by an encrypting key inputted by the encrypting unit 1601 and, thereafter, embedded into each block of the audio data by the digital watermark embedding unit 1404. The hash value of each block of the audio data generated by the hash calculating unit 1405 is enciphered by an encrypting key inputted by the encrypting unit 1602 and, thereafter, embedded into each embedding frame by the digital watermark embedding unit 1406.

By using the encrypting units, in the case where the hash frame of an image is altered, even when the hash function is known, unless the encrypting key is known, the data which is embedded into each block of the audio data cannot be obtained. Therefore, more advanced security can be assured. The common key encrypting system such as DES or the public key encrypting system such as RSA is used as an encrypting system which is used here. The value which is obtained in the case where the public key encrypting system such as RSA is used and the encryption is performed by using its secret key is a digital signature.

Figure 17:
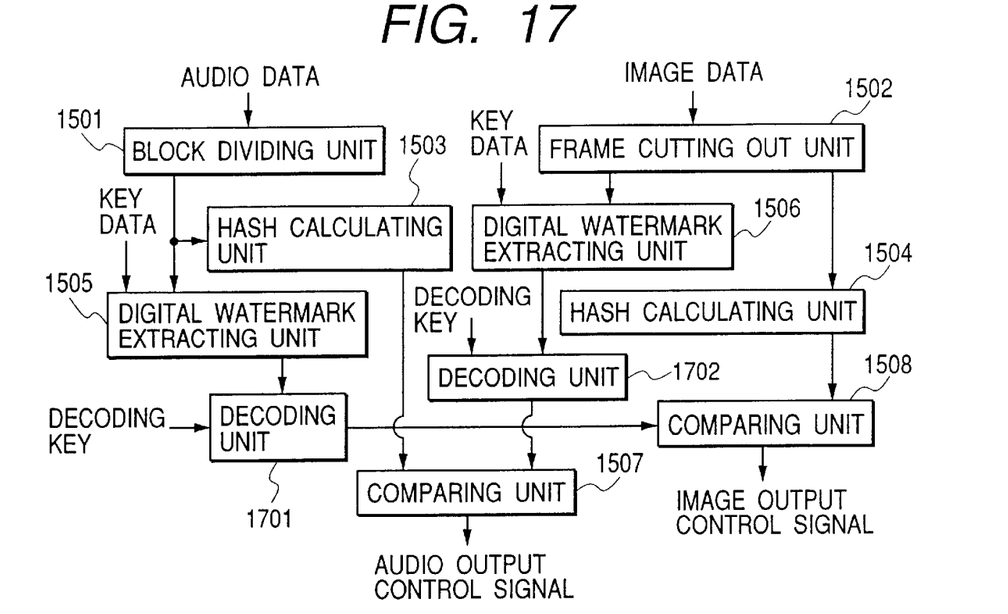
FIG. 17 is a diagram showing an example of an output control system of the eighth embodiment.

FIG. 17 is a block diagram showing an output control system corresponding to the digital watermark embedding system of FIG. 16.

The present system comprises: the block dividing unit 1501, frame cutting-out unit 1502, hash calculating units 1503 and 1504, digital watermark extracting units 1505 and 1506, and comparing units 1507 and 1508 which perform the operations similar to those in FIG. 15; and decoding units 1701 and 1702 corresponding to the encrypting units 1601 and 1602 in FIG. 16.

The hash frame which was extracted from the audio block by the digital watermark extracting unit 1505 and encrypted is decoded by the decoding unit 1701 and the inputted decoding key. The audio frame which was extracted from the embedding frame by the digital watermark extracting unit 1506 and encrypted is decoded by the decoding unit 1702 and the inputted decoding key. The subsequent operation is similar to that in the output control system in FIG. 15.

When the digital signature is extracted by the digital watermark extracting units 1505 and 1506, for example, the decoding units 1701 and 1702 perform the decoding by the public key corresponding to the secret key used for formation of the signature.

Figure 18:
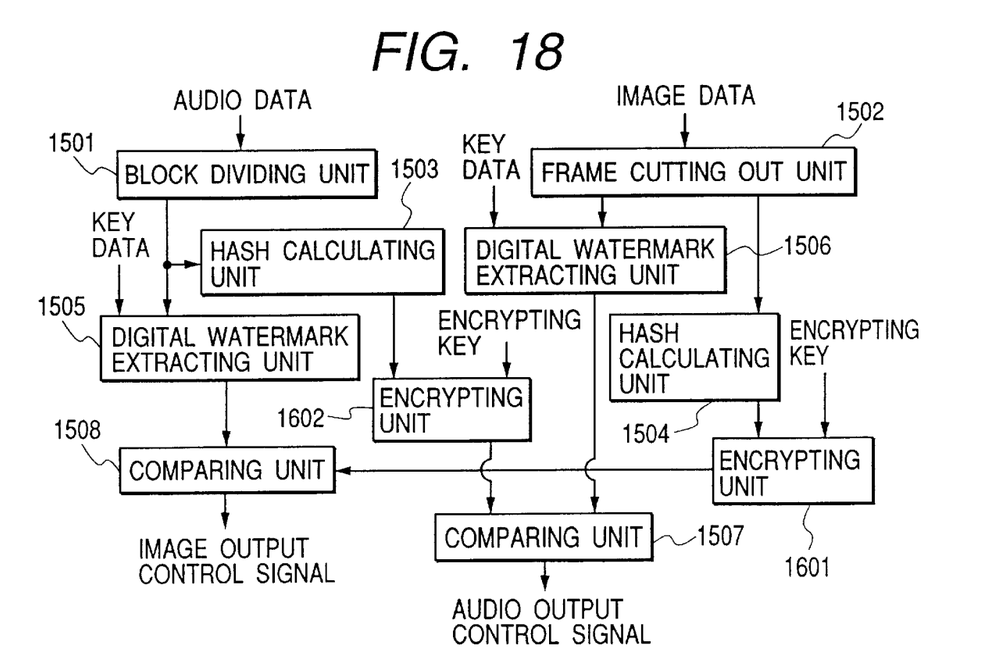
FIG. 18 is a diagram showing an example of an output control system of the eighth embodiment.

FIG. 18 is a block diagram showing an output control system corresponding to the digital watermark embedding system of FIG. 16.

This system comprises: the block dividing unit 1501, frame cutting-out unit 1502, hash calculating units 1503 and 1504, digital watermark extracting units 1505 and 1506, and comparing units 1507 and 1508 which perform the operations similar to those in FIG. 15; and the encrypting units 1601 and 1602 which perform the operations similar to those in FIG. 16.

The hash value calculated by the hash calculating unit 1504 is inputted to the encrypting unit 1601, encrypted by the same encrypting key as that used upon digital watermark embedding in the digital watermark embedding unit in FIG. 16, and inputted to the comparing unit 1508. Similarly, the hash value obtained by the hash calculating unit 1503 is encrypted by the encrypting unit 1602 and inputted to the comparing unit 1507. The other operation is similar to that in the output control system in FIG. 15.

Modifications

Although the digital watermark embedding apparatuses and the output devices for handling the analog audio video contents have been mentioned as examples in the above embodiments, the invention also incorporates digital equipment for handling other analog contents, digital contents, and the like, an apparatus for embedding digital watermark information into the other contents, an apparatus for performing an output control of the contents on the basis of the digital watermark information, and the like.

In the digital watermark embedding apparatus shown in FIG. 1, by deleting the A/D converting devices 103 and 104 and D/A converting devices 109 and 110, a digital watermark embedding apparatus which can be used for digital equipment to handle digital contents can be constructed.

In the output device shown in FIG. 2, by deleting the A/D converting devices 204 and 205, digital output equipment for handling digital contents can be constructed.

In contents including a plurality of objects such as an MPEG-4 image or the like, the invention also incorporates an apparatus, a method, and the like such that digital watermark information is embedded into each object and an output control of the contents is performed on the basis of the digital watermark information.

In the embedding device 105 in FIG. 1, by providing an object extracting process for extracting an object from an MPEG-4 image in place of the frame cutting-out unit and block dividing unit, a digital watermark embedding apparatus for the MPEG-4 image can be constructed.

By performing the process to extract the object by the output control device shown in FIG. 2 in place of the frame cutting-out unit and block dividing unit, an output device for controlling an output by a digital watermark embedded in the MPEG-4 image can be constructed.

By combining the foregoing digital watermark embedding systems, a digital watermark embedding system of high security can be constructed.

Further, by combining the output control systems of the contents in the foregoing embodiments, it is possible to cope with a case where the digital watermark embedding systems are combined.

The invention is not limited to the apparatus and method for performing the steps in each of the foregoing embodiments but also incorporates a storage medium or the like in which a program to execute the steps has been stored in a computer readable state. For example, the effects of the invention can be obtained by a computer system comprising a CPU and a memory. In this case, the memory corresponds to the storage medium according to the invention.

That is, the storage medium in which program codes of software to execute the operations described in the foregoing embodiments have been stored is used by a system or an apparatus, and a CPU of the system or apparatus reads out and executes the program codes stored in the storage medium, so that the objects of the invention can be accomplished.

As a storage medium, a semiconductor memory such as ROM, RAM, or the like, an optical disk, a magneto-optic disk, a magnetic medium, or the like can be used, or they can be constructed and used as a CD-ROM, a floppy disk, a magnetic medium, a magnetic card, a nonvolatile memory card, and the like.

Therefore, even if the storage medium is used in a system or an apparatus other than the systems or apparatuses shown in the drawings and a computer of the system or apparatus reads out and executes the program codes stored in the storage medium, functions similar to those in the embodiments can be realized, similar effects can be obtained, and the objects of the invention can be accomplished.

In the case where the OS or the like which operates on the computer executes a part or all of the processes or even in the case where the program codes read out from the storage medium are written into a memory equipped for an expanding function board inserted in the computer or an expanding function unit connected to the computer, and thereafter, a CPU or the like equipped for the expanding function board or expanding function unit executes a part or all of the processes on the basis of instructions of the program codes, functions similar to those in the foregoing embodiments can be realized, similar effects can be obtained, and the objects of the invention can be accomplished.

According to the invention as described above, since the digital watermark information which are mutually concerned is embedded into a plurality of kinds of data, by using both digital watermark information after that, whether both data coincide or not, whether alteration or the like has been performed to either one of them or not, or the like can be discriminated.

Consequently, the alteration of multimedia contents comprising audio data and images (motion images, still images) having a copyright can be prevented. Further, the output of the multimedia contents can be controlled.

Thus, a digital watermark embedding technique for integratedly managing a plurality of kinds of contents such as still images, motion images, audio sound, and the like can be provided.

The present invention is not limited to the foregoing embodiments but many modifications and variations are possible within the spirit and scope of the appended claims of the invention.

What is claimed is:

1. A data processing apparatus comprising:
   input means for inputting a first kind of data stream and a second kind of data stream;
   first embedding means for dividing the first kind of data stream into first embedding units, and embedding first digital watermark information into the first kind of data stream divided into the first embedding units; and
   second embedding means for dividing the second kind of data stream into second embedding units different from the first embedding units, and embedding second digital watermark information relating to the first digital watermark information into the second kind of data stream divided into the second embedding units.

2. An apparatus according to claim 1, wherein first and second embedding means embed same digital watermark information into said first and second data streams.

3. An apparatus according to claim 1, wherein said first and second digital watermarks are numerical value information.

4. An apparatus according to claim 1, wherein said first embedding means error correction encodes said first digital watermark information and, thereafter, embeds said first digital watermark information into said first or second data streams, and wherein said second embedding means error correction encodes said second digital watermark information, and thereafter embeds said second digital watermark information into said second or first data streams.

5. A data processing apparatus comprising:
   input means for inputting a first kind of data stream and a second kind of data stream; and
   embedding means for embedding related digital watermark information into each of said first and second data streams,
   wherein said first and second data streams are an audio data stream and an image data stream.

6. An apparatus according to claim 1, wherein said first kind of data stream and said second kind of data stream are data streams which are mutually concerned with respect to time.

7. A data processing method comprising:
   an input step of inputting a first kind of data stream and a second kind of data stream;
   first embedding means for dividing the first kind of data stream into first embedding units, and embedding first digital watermark information into the first kind of data stream divided into the first embedding units; and
   second embedding means for dividing the second kind of data stream into second embedding units different from the first embedding units, and embedding second digital watermark information relating to the first digital watermark information into the second kind of data stream divided into the second embedding units.

8. A storage medium which stores a program in a computer readable state, said program comprising:
   an input step of inputting a first kind of data stream and a second kind of data stream;
   first embedding means for dividing the first kind of data stream into first embedding units, and embedding first digital watermark information into the first kind of data stream divided into the first embedding units; and
   second embedding means for dividing the second kind of data stream into second embedding units different from the first embedding units, and embedding second digital watermark information relating to the first digital watermark information into the second kind of data stream divided into the second embedding units.

9. A data processing apparatus comprising:
   input means for inputting a first kind of data stream and a second kind of data stream which correspond to each other with respect to time;
   extracting means for extracting digital watermark information from each of said first and second data streams; and
   control means for controlling whether said first and second data streams are outputted or not with reference to both of the extracted digital watermark information,
   wherein, first digital watermark information is embedded into the first kind of data stream in a first embedding unit, and second digital watermark information relating to the first digital watermark information is embedded in the second kind of data stream in a second embedding unit different from the first embedding unit.

10. A data processing method comprising:
    an input step of inputting a first kind of data stream and a second kind of data stream which correspond to each other with respect to time;
    an extracting step of extracting digital watermark information from each of said first and second data streams; and
    a control step of controlling whether said first and second data streams are outputted or not with reference to both of the extracted digital watermark information,
    wherein, first digital watermark information is embedded into the first kind of data stream in a first embedding unit, and second digital watermark information relating to the first digital watermark information is embedded in the second kind of data stream in a second embedding unit different from the first embedding unit.

11. A storage medium which stores a program in a computer readable state, said program comprising:
    an input step of inputting a first kind of data stream and a second kind of data stream which correspond to each other with respect to time;
    an extracting step of extracting digital watermark information from each of said first and second data streams; and
    a control step of controlling whether said first and second data streams are outputted or not with reference to both of the extracted digital watermark information,
    wherein, first digital watermark information is embedded into the first kind of data stream in a first embedding unit, and wherein second digital watermark information relating to the first digital watermark information is embedded in the second kind of data stream in a second embedding unit different from the first embedding unit.

12. A data processing apparatus comprising:
    input means for inputting a first kind of data stream and a second kind of data stream which correspond to each other with respect to time;
    first dividing means for dividing said first data stream into a plurality of streams;
    second dividing means for dividing said second data stream into a plurality of streams; and embedding means for embedding one of said first data streams obtained by said first dividing means as digital watermark information into one of said second data streams obtained by said second dividing means, wherein said first data stream is image data comprising a plurality of frames and said second data stream is audio data.

13. A data processing method comprising:

an input step of inputting a first kind of data stream and a second kind of data stream which correspond to each other with respect to time;

a first dividing step of dividing said first data stream into a plurality of streams;

a second dividing step of dividing said second data stream into a plurality of streams; and an embedding step of embedding one of said first data streams obtained in said first dividing step as digital watermark information into one of said second data streams obtained in said second dividing step, wherein said first data stream is image data comprising a plurality of frames and said second data stream is audio data.

14. A storage medium which stores a program in a computer readable state, said program comprising:

an input step of inputting a first kind of data stream and a second kind of data stream which correspond to each other with respect to time;

a first dividing step of dividing said first data stream into a plurality of streams;

a second dividing step of dividing said second data stream into a plurality of streams; and an embedding step of embedding one of said first data streams obtained in said first dividing step as digital watermark information into one of said second data streams obtained in said second dividing step, wherein said first data stream is image data comprising a plurality of frames and said second data stream is audio data.

15. A data processing method comprising:

an input step of inputting a first kind of data stream and a second kind of data stream; and an embedding step of embedding related digital watermark information into each of said first and second data streams, wherein said first and second data streams are an audio data stream and an image data stream.

16. A storage medium which stores a program in a computer readable state, said program comprising:

an input step of inputting a first kind of data stream and a second kind of data stream; and an embedding step of embedding related digital watermark information into each of said first and second data streams, wherein said first and second data streams are an audio data stream and an image data stream.

17. A data processing apparatus comprising:

input means for inputting a first kind of data stream and a second kind of data stream which correspond to each other with respect to time;

extracting means for extracting digital watermark information from each of said first and second data streams; and control means for controlling whether said first and second data streams are outputted or not with reference to both of the extracted digital watermark information, wherein said first kind of data stream is audio data, and said second kind of data stream is image data.

18. A data processing method comprising:

an input step of inputting a first kind of data stream and a second kind of data stream which correspond to each other with respect to time;

an extracting step of extracting digital watermark information from each of said first and second data streams; and a control step of controlling whether said first and second data streams are outputted or not with reference to both of the extracted digital watermark information, wherein said first kind of data stream is audio data, and said second kind of data stream is image data.

19. A storage medium which stores a program in a computer readable state, said program comprising:

an input step of inputting a first kind of data stream and a second kind of data stream which correspond to each other with respect to time;

an extracting step of extracting digital watermark information from each of said first and second data streams; and a control step of controlling whether said first and second data streams are outputted or not with reference to both of the extracted digital watermark information, wherein said first kind of data stream is audio data, and said second kind of data stream is image data.

20. A data processing apparatus comprising:

input means for inputting a first kind of data stream and a second kind of data stream;

first embedding means for dividing said first kind of data stream into first embedding units, and embedding first digital watermark information into said first kind of data stream divided into the first embedding units; and second embedding means for dividing said second kind of data stream into second embedding units different from the first embedding units, and embedding second digital watermark information into said second kind of data stream divided into the second embedding units.

21. A data processing method comprising:

an input step of inputting a first kind of data stream and a second kind of data stream;

a first embedding step of dividing said first kind of data stream into first embedding units, and embedding first digital watermark information into said first kind of data stream divided into the first embedding units; and a second embedding step of dividing said second kind of data stream into second embedding units different from the first embedding units, and embedding second digital watermark information into said second kind of data stream divided into the second embedding units.

22. A storage medium which stores a program in a computer readable state, said program comprising:

an input step of inputting a first kind of data stream and a second kind of data stream;

a first embedding step of dividing said first kind of data stream into first embedding units, and embedding first digital watermark information into said first kind of data stream divided into the first embedding units; and a second embedding step of dividing said second kind of data stream into second embedding units different from the first embedding units, and embedding second digital watermark information into said second kind of data stream divided into the second embedding units.

* * * * *